United States Patent
Schuck et al.

(10) Patent No.: US 10,838,057 B2
(45) Date of Patent: Nov. 17, 2020

(54) RADAR SYSTEM AND METHOD FOR DETERMINING A ROTATIONAL STATE OF A MOVING OBJECT

(71) Applicant: Lockheed Martin Corporation, Bethesda, MD (US)

(72) Inventors: Tod M. Schuck, Lumberton, NJ (US); David B. Reese, Folcroft, PA (US); Mark A. Friesel, Ewing, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 304 days.

(21) Appl. No.: 15/785,376

(22) Filed: Oct. 16, 2017

(65) Prior Publication Data

US 2018/0136326 A1 May 17, 2018

Related U.S. Application Data

(60) Provisional application No. 62/408,674, filed on Oct. 14, 2016.

(51) Int. Cl.
  *G01S 13/58*  (2006.01)
  *G01S 7/41*   (2006.01)
  *F41H 11/02*  (2006.01)

(52) U.S. Cl.
  CPC .......... *G01S 13/583* (2013.01); *G01S 7/415* (2013.01); *F41H 11/02* (2013.01)

(58) Field of Classification Search
  CPC ......... G01S 13/583; G01S 7/415; F41H 11/02
  USPC ....................................................... 342/115
  See application file for complete search history.

(56) References Cited

U.S. PATENT DOCUMENTS

| | | | | |
|---|---|---|---|---|
| 5,652,594 A | * | 7/1997 | Costas | G01S 7/2922 342/115 |
| 9,297,886 B1 | * | 3/2016 | Mountcastle | G01S 7/36 |
| 2002/0105469 A1 | * | 8/2002 | Albats, Jr. | G01S 13/0209 343/719 |
| 2008/0125668 A1 | * | 5/2008 | Graupe | A61B 5/4362 600/511 |
| 2018/0136326 A1 | * | 5/2018 | Schuck | G01S 7/415 |

* cited by examiner

*Primary Examiner* — Bo Fan
(74) *Attorney, Agent, or Firm* — Baker Botts L.L.P.

(57) ABSTRACT

A Doppler radar system includes a Doppler radar processor, a memory in communication with radar processor and a transmit/receive controller. The memory includes computer readable instructions that cause the Doppler radar processor to transmit a radar signal toward the airborne object at a frequency; receive reflected radar signals off of the airborne object, including frequencies produced as a result of Doppler effect due to relative motion between features of the airborne object and the radar system; and Fourier transform the received signals into the frequency domain. Peak frequencies and their harmonic frequency families are sorted and identified. The logarithm of the Fourier transform is calculated to generate a quefrency cepstrum. To identify features producing cyclic, periodic Doppler frequency patterns, peak quefrencies and rahmonic families associated with a quefrency peak are sorted and identified. The rotational state of the airborne object based on the identified quefrency families is determined.

20 Claims, 13 Drawing Sheets

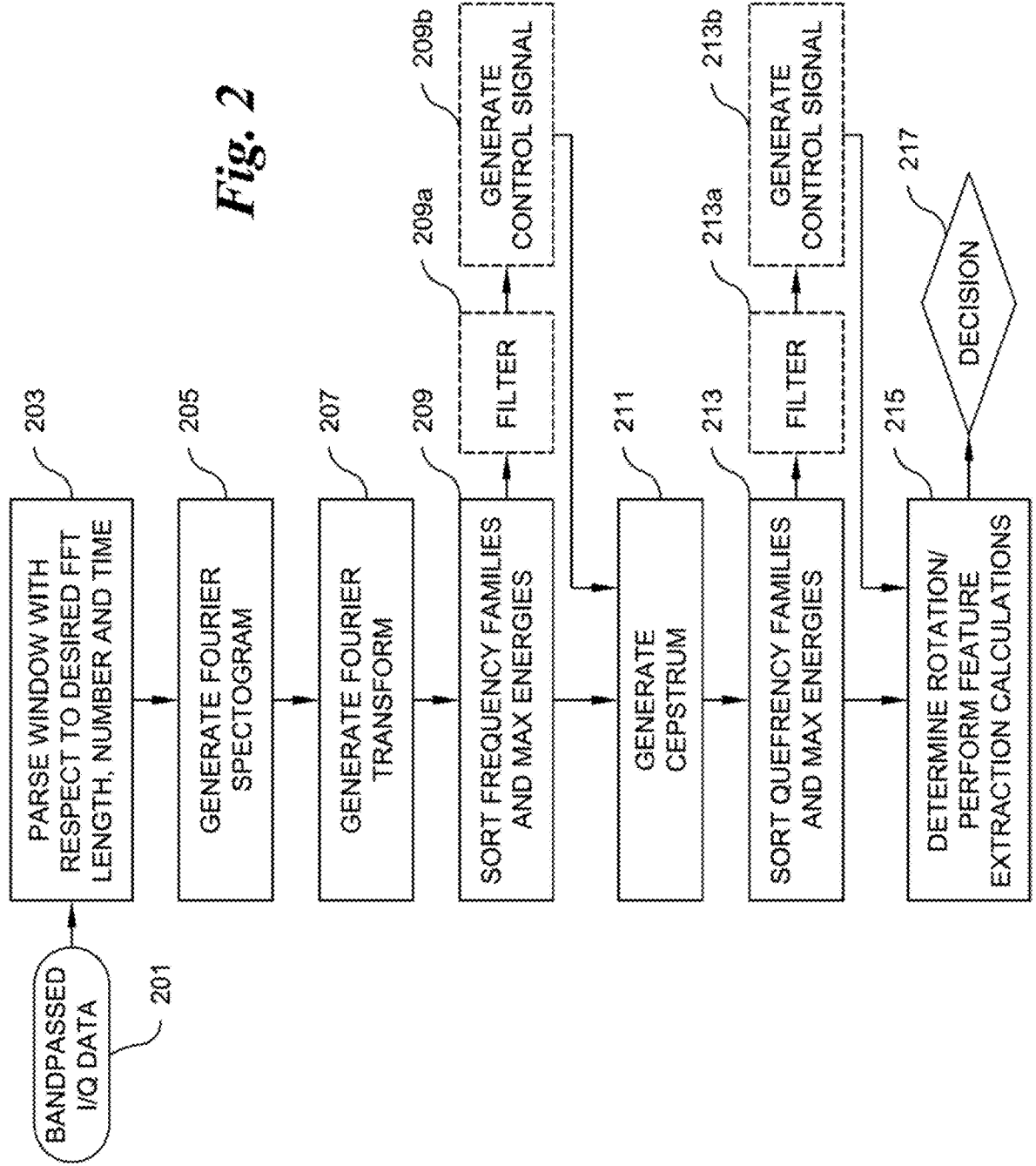

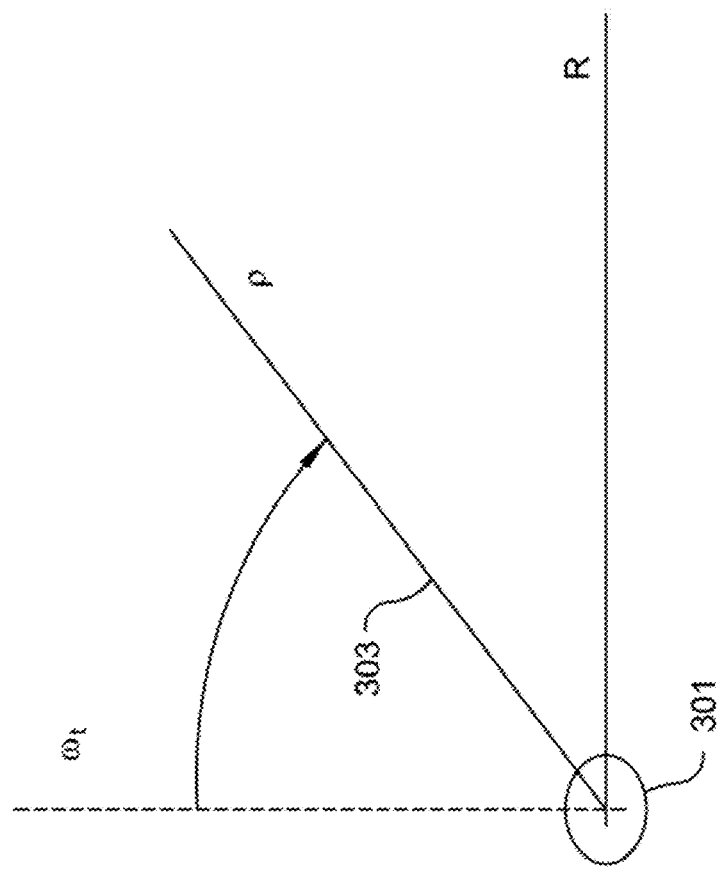

RADAR SYSTEM AND METHOD FOR DETERMINING A ROTATIONAL STATE OF A MOVING OBJECT

CROSS-REFERENCE TO RELATED APPLICATION

This application claims the benefit of and priority to U.S. Provisional Patent Application Ser. No. 62/408,674, filed Oct. 14, 2016, the entire disclosure of which is incorporated by reference herein for all purposes.

FIELD OF THE INVENTION

This disclosure relates to systems and methods for determining and classifying targets using radar.

BACKGROUND OF THE INVENTION

Long range ballistic missile (BM) threats frequently employ multiple stages to achieve exo-atmospheric altitudes. Generally, these threats produce multiple radar-detectable components during re-entry into the atmosphere. These components may include a re-entry vehicle (RV), booster stages, various types of debris or chaff, among other airborne or falling objects associated with the missile. Generally, the RV is designed in such a way to achieve re-entry in a controlled manner in order to accurately strike an intended target area. Other components will typically have uncontrolled movements as they are not intended to re-enter the atmosphere and reach a specific point. They may either burn up during re-entry, or they may fall randomly. These objects present challenges to threat countermeasures (e.g., interceptor missiles) as it may not be possible to differentiate these objects from a threat target at the time an engagement order is issued. Improved systems and methods for detection and differentiation of these airborne objects are desired.

SUMMARY

In an embodiment, a method for determining whether an airborne object is rotating comprises the steps of receiving reflected radar signals off of the airborne object. In a Doppler radar processor of the radar system, the received radar signals are processed to generate a frequency spectrum corresponding to the airborne object. A quefrency cepstrum is generated based on the generated frequency spectrum corresponding to the detected airborne object. One or more quefrency peaks are identified from the quefrency cepstrum and a rotational state of the airborne object is determined based on comparing the identified quefrency peaks with one or more threshold values. The step of determining a rotational state of the airborne object further comprises calculating from the one or more quefrency peaks in the quefrency cepstrum, a rotational velocity of a main body of the detected airborne object.

In one embodiment, there is disclosed a method comprising the steps of: receiving reflected radar signals off of an airborne object; in a Doppler radar computer processing device, processing the received radar signals to generate a frequency spectrum corresponding to the airborne object; generating a quefrency cepstrum based on the generated frequency spectrum and corresponding to the detected airborne object; detecting for the presence one or more quefrency peaks in the quefrency cepstrum; and determining a rotational state of the airborne object responsive to the detecting of one or more quefrency peaks and one or more threshold values.

The step of determining a rotational state of the airborne object responsive to the detecting for one or more quefrency peaks and one or more threshold values further comprises comparing a rotational velocity of the detected airborne object over a predetermined number of data samples to detect the presence of a cyclic rotation component of the detected airborne object.

On the condition that no cyclic rotation component is detected, the system generates an output indicative of a determination that the rotational state of the airborne object is in a state of controlled flight.

On the condition that a cyclic rotation component is detected, the detected quefrency peaks in the cepstrum are compared to determine whether the detected quefrency peaks are linear multiples of one another.

Responsive to determining that the detected quefrency peaks are linear multiples of one another, the system generates an output indicative of a determination that the rotational state of the airborne object is in a state of axial spin.

Responsive to determining that the detected quefrency peaks are not linear multiples of one another, the system generates an output indicative of a determination that the rotational state of the airborne object is in a tumbling state.

In one embodiment, the method further comprises the step of determining a sample vector size defining the number of samples of the received radar signals to be processed in an epoch based on a selected threat mode of the detected airborne object.

The selected threat mode may be one of a ballistic missile boost, midcourse, and terminal phase, and the number of samples to be processed in an epoch is at least a Nyquist rate for sampling a minimum of two rotations of at least one identified feature of the airborne object. In one embodiment, the system is configured to automatically adjust the sample vector size according to a sensed environmental condition or selected threat mode.

In an embodiment, the rotational velocity of the main body of the airborne object is calculated according to:

$$V_{RMB} = f_{D1} - f_{D2} \approx (V_{R2} - V_{R1})\left(\frac{2\pi f_T}{c}\right) \text{ in m/s}$$

wherein, $f_{D1}$ and $f_{D2}$ represent the Doppler frequency extents for the main body of the airborne object, $V_{R2}$ and $V_{R2}$ represent rotation velocities, $f_T$ is the transmitter frequency, and c is the speed of light. A sample vector size is determined to define the number of samples of the received radar signals to be processed in an epoch based on a selected threat mode of the airborne object. In an embodiment, the selected threat mode is one of a ballistic missile boost, midcourse, or terminal phase. The number of samples to be processed in an epoch is required to support cyclic Nyquist criteria for sampling a minimum of two rotations of at least one identified feature of the airborne object. The two rotations of the at least one identified feature of the airborne object correspond to rotations of an identified feature having a slowest rotating rate based on the selected threat mode. In an embodiment, the method further comprises filtering the target time series of samples using a finite response filter (FIR) to provide attenuation of side lobes and roll off in the frequency domain. The method further comprises generating a power spectral density of the time series of samples in an epoch; and comparing a noise level of the target time series of samples to a noise level threshold for cyclic processing. The method further comprises the steps of determining a power level per frequency bin; and identifying an occurrence of a flight event responsive to the determined power level per frequency bin exceeding a given threshold. The occurrence of a flight event identified is one of a booster separation and an intercept event. In one embodiment the radar system is configured as a continuous wave (CW) radar system. In another embodiment, the radar system is configured as a high pulse repetition frequency (PRF) radar.

In an embodiment, a system for determining whether an airborne object is rotating includes a Doppler radar system including a Doppler radar processor, a memory in communication with the Doppler radar processor and a transmit/receive controller. The memory includes computer readable instructions that when executed by the radar processor, cause the Doppler radar processor to perform the steps of, transmitting a radar signal toward the airborne object at a frequency; receiving reflected radar signals reflected off of the airborne object, the reflected radar signals including a plurality of frequencies produced as a result of Doppler effect due to relative motion between features of the airborne object and the radar system. A radar processor of the radar system calculates a Fourier transform to convert the received radar signals into the frequency domain. Peak frequencies and their harmonic frequency families are sorted and identified. The logarithm of the Fourier transform is performed to generate a quefrency cepstrum. To identify features producing cyclic, periodic Doppler frequency patterns, peak quefrencies and associated rahmonic families associated with a quefrency peak are sorted and identified. The rotational state of the airborne object based on the identified quefrency families is determined.

In an embodiment, a method for determining whether an airborne object is rotating includes the steps of, in a Doppler radar system, transmitting a radar signal toward the airborne object at a frequency; receiving reflected radar signals reflected off of the airborne object, the reflected radar signals including a plurality of frequencies produced as a result of Doppler effect due to relative motion between features of the airborne object and the radar system. In a radar processor of the radar system, calculating a Fourier transform to convert the received radar signals into the frequency domain. Peak frequencies and their harmonic frequency families are sorted and identified. The logarithm of the Fourier transform is performed to generate a quefrency cepstrum. To identify features producing cyclic, periodic Doppler frequency patterns, peak quefrencies and associated rahmonic families associated with a quefrency peak are sorted and identified. The rotational state of the airborne object based on the identified quefrency families is determined.

In one embodiment, a Doppler radar system includes a Doppler radar processor, a memory in communication with radar processor and a controller. The memory includes computer readable instructions that cause the Doppler radar processor to perform the steps of: processing received radar signals reflected off of an airborne object to generate a frequency spectrum corresponding to the detected airborne object; generating a quefrency cepstrum based on the generated frequency spectrum and corresponding to the detected airborne object; analyzing the quefrency cepstrum to determine the presence or absence of one or more quefrency peaks in the quefrency cepstrum; determining a rotational state of the airborne object responsive to the determination of the presence or absence of one or more quefrency peaks and comparison with one or more threshold values.

In one embodiment the Doppler radar processor is configured to provide control commands to the controller to cause transmission of a radar signal as a continuous wave (CW) Doppler radar signal toward the airborne target to generate the reflected radar signals off of the target.

The computer readable instructions contain instructions which when executed by the radar processor, cause the radar processor to further calculate a rotational velocity associated with the airborne object, and compare the calculated rotational velocities of the detected airborne object over a predetermined number of data samples to detect the presence or absence of a cyclic rotation component of the detected airborne object.

In one embodiment, the Doppler radar processor generates an output indicative of a determination that the rotational state of the airborne object is in a state of controlled flight when no cyclic rotation component is detected.

In one embodiment, the Doppler radar processor generates an output indicative of a determination that the rotational state of the airborne object is in a state of axial spin in response to detection of the presence of a cyclic rotation component in the cepstrum and detection of linear multiples of quefrency peaks in the cepstrum.

BRIEF DESCRIPTION OF THE DRAWINGS

FIG. 2 is a diagram illustrating a classification process using cyclic phenomenology according to an embodiment of the disclosure.

FIG. 3 is a diagram illustrating a torque vector for an airborne object according to an embodiment of the disclosure.

DETAILED DESCRIPTION

Figure 1:
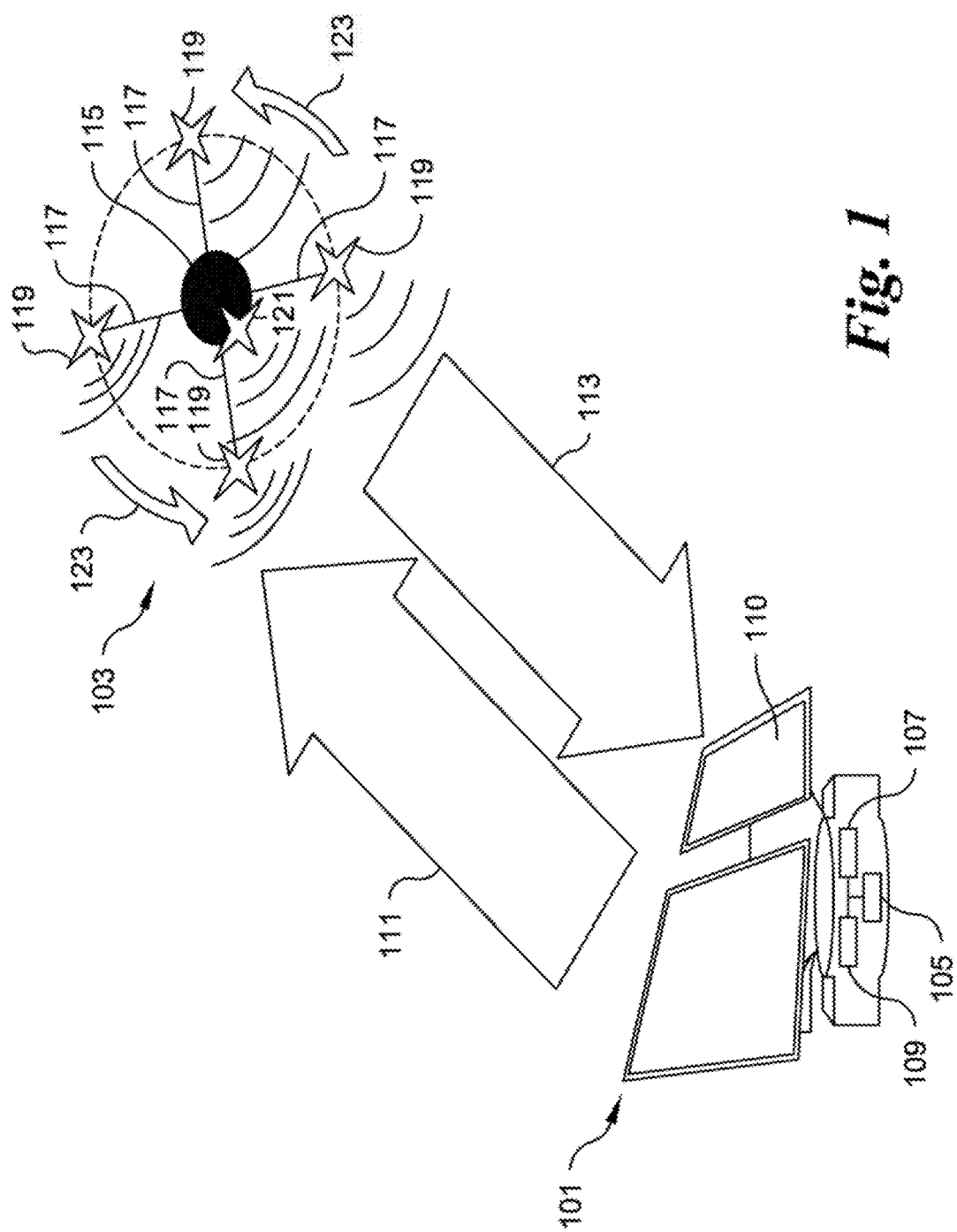
FIG. 1 is an illustration of a high resolution Doppler radar system used in accordance with an embodiment of the present disclosure.

It is to be understood that the figures and descriptions of embodiments of the present invention have been simplified to illustrate elements that are relevant for a clear understanding of the present invention, while eliminating, for purposes of clarity, many other elements found in signal processing systems, including radar systems and object classification systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the inventions may be practiced. It is to be understood that the various embodiments, although different, are not necessarily mutually exclusive. Furthermore, a particular or select feature, structure, or characteristic described herein in connection with one embodiment may be implemented within other embodiments without departing from the scope of the disclosure. In addition, it is to be understood that the location or arrangement of individual elements within each disclosed embodiment may be modified without departing from the scope of the disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several views.

As the sophistication of ballistic and terrestrial threats advances, the need for improved methods of threat discrimination and fire control references also increases. Present discrimination methods are limited to the use of conventional and familiar metrics, such as physics-based features of moments, centripetal accelerations, relative size, specific energy, and angular momentum. Approaches which attempt to leverage these familiar metrics often over-task sensors with respect to their core functionality (e.g., volume search radars). For example, current radar processing discrimination systems and methods require a mode change and generation of large numbers of duty cycles for quasi imaging, as well as requiring significantly large bandwidths (e.g. on the order of hundreds of MHz) when utilizing the above described metrics to attempt object classification. Embodiments of the present disclosure overcome these technological obstacles inherent in such systems by means of a high resolution Doppler radar system with a resolution of about ten hertz (10 Hz) or with a high pulse repetition frequency (PRF) of at least 20,000 Hz with integrated phenomenology based discrimination processing disclosed herein, to thereby improve one or more of system detection, determination, classification, and control of moving objects that may exhibit ballistic and/or non-ballistic motion or behavior. Furthermore, existing sensor technologies are strained by increased tactical and operational capabilities of modern threats, such as increased range of operations, increased maneuverability and deployment of countermeasures. Embodiments of the present disclosure include X-band, C-band or at least S-band high resolution Doppler radar processors integrated with phenomenology based discrimination processing for measuring select cyclic Doppler characteristics of one or more airborne objects or targets of interest. The system transforms in quefrency space measured characteristics or parameters utilizing select characteristics or metrics to detect and determine object motion with enhanced accuracy, and with reduced processing requirements and significantly narrower bandwidth. Embodiments can provide high quality object identification, classification, and other benefits, based on bandwidth in the range of 100 KHz to 300 KHz. Still further, embodiments of the present Doppler radar and integrated phenomenology based discrimination system and method provide for less computer processing intensive operations, in contrast to higher processing loads required for processing large bandwidth signals needed for present computerized determination and classification systems.

In embodiments, a high resolution Doppler radar system and method with integrated phenomenology based discrimination processing may comprise a continuous wave (CW) radar or frequency modulated CW radar or other high resolution Doppler radar with high PRF configured to process observed phenomena based on the physics of motion, material property exploitation, and environmental interaction for one or more of the purposes of detection, identification, classification and fire control reference generation. Furthermore, cyclic processing of measured return data is employed to identify and analyze motion-related phenomenology to exploit target characteristics that exhibit select behaviors, such as non-ballistic gross motions, and micromotions, by way of non-limiting example.

Embodiments of the present disclosure advantageously utilize the tendency of objects exhibiting ballistic or non-ballistic behaviors to provide "tells" or identifiable characteristics as to an object's classification or function. Reflections of transmitted radar signals directed at both ballistic and non-ballistic objects may be processed by a radar processor according to a cyclic processing method that enables the threat targets within a radar scene to be identified and isolated with greater confidence. According to one or more embodiments of the present disclosure, a radar system employing cyclic processing methods according to embodiments of the disclosure enables effective threat classification. Embodiments according to the present disclosure provide increased effectiveness for identifying and classifying threats and provide the benefits of a reduction in the number of countermeasures (e.g., missiles) needed per engagement event, an increase in the probability of engagement support ($P_{es}$), improved target object mapping (TOM) information, and increased performance against varying threat sets, by way of non-limiting example.

A potential target or threat, in particular, a threat object exhibiting non-ballistic motion (e.g., controlled flight), will frequently possess one or more rotational structures associated with the object. For example, the threat object may have propeller blades for thrust, rocket fins for stabilization or steering, outlets (e.g. exhaust ports), bolts, rivets or the like which are disposed on the surface of the main body of the object. Frequently, these structures will rotate relative to the main body of the object. The inventors recognize that rotational movement of these structures defines periodic motion relative to the overall motion of the object, and impart a periodic modulation of the scattered and reflected radar energy off the object, given the radar signal wavelength is sufficiently short relative or incident to the dimensions of the object(s) being reflected. The inventors further recognize rotational structures associated with the target object may provide unique identifiers that may be discerned by processing the amplitude and phase components of a reflected radar waveform (e.g. planar wave).

An exemplary reflected radar waveform varies with time. However, if the individual elemental scatterers responsible for the reflections are rotated in a continuous, periodic manner, then both the phase and amplitude of the reflected waveform vary in a continuous, periodic manner. This allows embodiments of the present disclosure to utilize cyclostationary techniques where, in the case of rotating objects, the signal statistics are stationary and time invariant over the periodic interval equal to one rotational period of the object's main body. In this phenomenology, the statistics of the rotating structures are also ergodic, and the system allows event samples to replace time samples in the analysis. This is significant in that absolute time is replaced by events that occur over the relative rotational period $T_p$. Accordingly, the scatterers are cyclic across this interval, or epoch, and may be characterized by periodic changes in phase $\phi(t)$ and amplitude $a(t)$ over period $T_p$.

FIG. 1 is a simplified illustration of a high Doppler resolution radar system, such as an X-band, C-band CW (or frequency modulated CW) or at least S-band radar system, useful in implementing the systems and methods according to embodiments of this disclosure. CW radar defines a type of radar in which a known frequency continuous wave (e.g. not pulsed) is transmitted by a radar transmitter into the air or atmosphere. The continuous wave signal impinges on one or more objects in the signal's path and the signal is reflected to a radar receiver. CW radar is based on the Doppler principle, in which the frequency of the reflected signal varies as a function of the relative motion and velocity of the object reflecting the signal. Doppler radar is largely immune to interference caused by large, stationary objects and slow moving clutter within the radar's field of view.

Figure 1A:
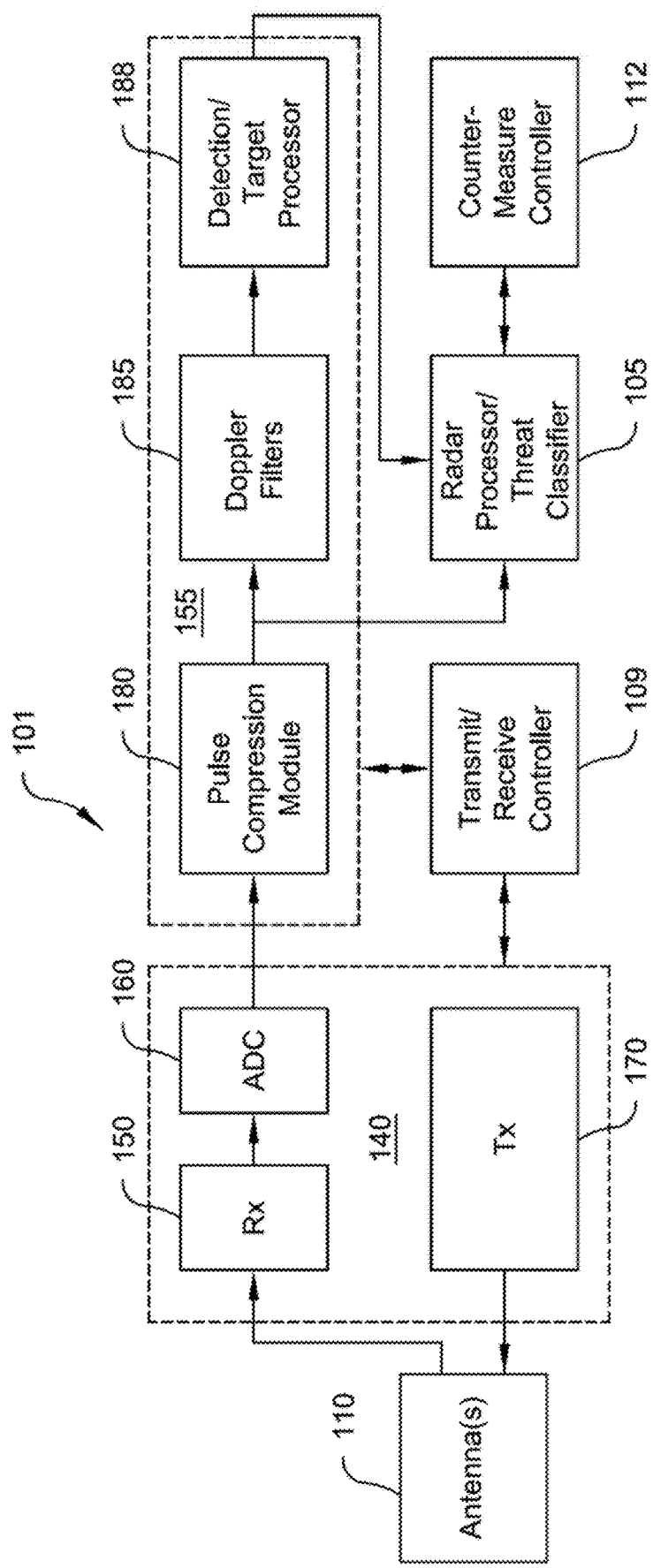
FIG. 1A is a more detailed view of components of the exemplary radar system of FIG. 1.

A CW radar system 101 for detecting an airborne target or threat 103 is shown in FIG. 1 (and FIG. 1A). CW radar system 101 includes a radar processor 105. Radar processor 105 may execute machine readable instructions for performing calculations and logic operations for classification and identification of threat 103. Radar processor 105 implemented as a digital computer processor is in communication with a memory 107. Memory 107 may store machine readable instructions that are executable by processor 105. Radar system 101 further includes a transmit/receive controller 109 in communication with memory 107 and radar processor 105. Transmit/receive controller 109 may include a second (or additional) processor and/or memory which may be configured to control signals transmitted (e.g., from a transmitter) and received (e.g. with a receiver) by radar system 101 via an antenna array of radar sensors or radiating antenna elements 110. Radar system 101 transmits radar signals 111 and directs radar signals 111 toward airborne object of threat 103. Transmitted radar signals 111 impinge on threat 103 and are reflected to radar system 101 as radar return signals 113. Return signals 113 are received by radar sensor array 110 and processed via transmit/receive controller 109 and/or radar processor 105.

Referring generally to FIG. 1A, there is shown a more detailed view of exemplary radar system 101 of FIG. 1, such as a pulse-Doppler or CW Doppler radar system, useful for describing embodiments of the present disclosure. As will be understood by one of ordinary skill in the art, radar system 101 may comprise a front-end module 140, including a transmitter 170 responsive to transmit/receive controller 109 for generating and transmitting one or more waveforms from antenna or radar sensor array 110. Reflected return signals resulting from the transmitted signals are subsequently received or captured by radar sensor array 110 and provided to at least one receiver 150 for signal modulation. Receiver 150 may include multiple processing components, such as one or more filters, low-noise amplifiers and down converters, as will be understood by one of ordinary skill in the art. At least one analog to digital converter (ADC) 160 is provided for converting received analog return signals to digital form.

System 101 may also include, by way of non-limiting example, a digital processing system 155, including a pulse compressor or pulse compression module 180 operative to receive post-A/D digitized in-phase and quadrature-phase (I/Q) signal data from front end module 140. As will be understood by one of ordinary skill in the art, pulse compression techniques may be implemented to achieve high range resolution without the need for high-powered antennas. Pulse compression may be accomplished by various filtering and/or line delay arrangements. For example, pulse compression may be achieved by applying a Fast Fourier Transform (FFT) to a received time-domain signal, thereby converting the data to the frequency domain. A weighting factor, or pulse compression weight (e.g. in the form of a vector-matrix) is applied in the frequency domain. An inverse FFT (IFFT) is applied to return the data streams to the time-domain.

The output of pulse compression module 180 comprises modulated data which may be subject to further processing, such as sampling the incoming data into range cells or bins, and generating one sample in each range bin for each pulse. Range bin data is provided to Doppler filters 185 which generate a series of Doppler bins for each range cell. Data from a particular Doppler bin corresponds to a signal from a target or background, at a given range, moving at a particular velocity. Once Doppler-filtered, return data is provided to a detection processor 188 operative to, for example, perform a target detection process against a time-averaged background map. These detection processes may include one or more of "greatest of" operations, as well as CFAR detection techniques. The results of this detection processing may be provided to, for example a display device (not shown) for end-user interfacing. Detection processor 188 may be further configured to perform constant false alarm rate processing by comparing the powers of each range/Doppler cell to a background clutter map. Radar processor 105 is responsive to complex I/Q data output from, for example, pulse compression module 180, and to target data (e.g. target range data) received from detection processor 188 for performing classification operations according to the embodiments described herein. Radar processor 105 is in communication with, for example, a computer countermeasure controller 112 (e.g., embodied as one or more computer processors) of a countermeasure system for initiating, for example, intercept operations based upon the results of the threat classification operations described herein.

Referring again to FIG. 1, threat 103 may be an aerial object such as a ballistic missile, by way of non-limiting example. Ballistic missile technologies have developed wherein upon reentry into the Earth's atmosphere, the RV may possess aerodynamic features or structures which allow for controlled flight. For example, projections or appendages such as wings, propellers, rudders or flaps may be present for facilitating controlled flight operations to guide threat 103 toward an intended target. As shown in FIG. 1, threat 103 may include a main body 115 and one or more fins 117 extending generally radially, for example, from main body 115. During controlled flight, threat 103 may rotate as indicated by directional arrows 123 about a longitudinal axis of main body 115.

As main body 115 rotates, transmitted radar signals 111 impinge on main body 115 at an exemplary location or position 121. Similarly, as fins 117 rotate about main body 115, the extended portions of the fins (e.g. tips 119) revolve around main body 115. As fin tips 119 revolve around main body 115, their velocity in relation to radar system 101 changes cyclically or periodically. As any one of fin tips 119 revolves, it moves away from radar system 101 for one half of the revolution cycle, while moving toward radar system 101 during the other half of the revolution. This change in relative velocity causes variations in the frequency of reflected radar signals 113 as compared to transmitted radar signals 111 due to the Doppler effect. As fin tip 119 approaches radar system 101, radar signals 111 are transmitted at a first frequency determined by the transmit/receive controller 109. Transmitted radar signals 111 impinge on the revolving fin tip 119 as it moves toward the source of transmitted radar signals 111. This relative motion causes reflected radar signal 113 from fin tip 119 to be at a higher frequency than transmitted signal 111. Likewise, when fin tip 119 is moving away from radar system 101 (e.g. in the same direction as transmitted radar signal 111), reflected radar signal 113 is received at a lower frequency than transmitted frequency 111. As a result of the rotation of threat 103, these movements of fin tips 119 are periodic, and the frequency of reflected signal 113 increases and decreases as threat 103 rotates corresponding to motion of fin tips 119 toward and away from radar system 101.

According to embodiments of the present disclosure, there is provided an exemplary implementation of cyclostationary techniques embodied in a Doppler radar system and method for detecting rotation and target features, identifying and classifying aerial objects.

A basic expression for phase modulation $\phi(t)$ may be stated as:

$$\emptyset(t) = \beta \sin \omega_p t \qquad \text{Equation (1)}$$

wherein the angular frequency or rate is $\omega_p = 2\pi/T_p$, with $T_p$ being the period over which an event occurs (e.g. rotational period of the object), and $\beta$ is the modulation index caused by the rotational scatterers.

The length of a path along which a rotating or rotatable structure moves (e.g. threat 103 of FIG. 1) relative to an illuminating radar (e.g. radar system 101 of FIG. 1), accounting for the range of the target to the radar, may be described as a distance D. Accordingly, the relationship of D to $\beta$ may be expressed as:

$$\beta = \frac{D\omega_0}{4\pi c} \qquad \text{Equation (2)}$$

wherein $\omega_0$ is the angular frequency of the incident radar wave, and c is the speed of light. Accordingly, phase modulation $\phi(t)$ may be represented as:

$$\emptyset(t) = \frac{D\omega_0}{4\pi c} \sin \omega_p t \qquad \text{Equation (3)}$$

As rotational scatterers move through a periodic rotation, $\beta$ varies as each scatter contributor moves relative to the motion of the target with respect to the illuminating radar (i.e., ΔD). The variations to $\beta$ cause modulated sidebands of the radar signal to scintillate according to $T_p$. This scintillation causes a periodicity that may be observed in the frequency domain, and extracted using cepstral analysis or autocorrelation processing to obtain a value of $T_p$, which is representative of the rate of spin of the sensed object. This processing may include phenomenology analysis based on amplitude modulation, complex phase modulation components and Fourier analysis, among other techniques.

Given the above, a method for identifying rotational features of a target using cyclic processing in a CW radar system according to embodiments of the present disclosure is described with reference to FIG. 2. Complex I/Q data as characterized above in Equations 1-3, is representative of the phase and amplitude components of radar signals reflected from an object or potential target, and is processed 201 by a bandpass filter. For example, a discrimination radar sensor antenna array may provide I/Q data that is received by a cyclic processor of a radar system (e.g. processor 105 of FIG. 1). The received I/Q data is stored in a high-speed memory for providing real-time processing of the incoming I/Q data. Processing operations including target detection, determination, calculation, identification or classification may be implemented on a computer device such as a blade server, or other light processing load computing device.

The received I/Q data is parsed in 203 (FIG. 2) with respect to a desired or target fast Fourier transform (FFT) length, number, and time interval. The windowing function may be implemented as a finite impulse response (FIR) filter that controls sideband generation by truncating the ends of the I/Q data sequence. Blackman and Kaiser-Bessel filters may be implemented as near-optimal FIR filters that help prevent the spectral characteristics of signals to not be masked by sidebands, as is understood in the art. More specifically, channelized I/Q data, representative of the magnitude and phase of the received signal, is compiled into a complex I/Q vector (e.g. real and imaginary portions). The length of the time series I/Q vector to be processed is determined based on the number of samples needed to support the cyclic Nyquist criteria for sampling across a minimum of two rotations of the target object. These criteria may be determined by the system based on determined or pre-select features of potential target objects as defined in a data base such as a classification library. For each threat mode of operation (e.g. boost, midcourse, and terminal mode), the slowest rotation rate of the slowest rotating object from features identified may drive the sample size to be acquired. The sampled set of I/Q data is referred to herein as the "epoch" to be processed.

A portion or portions of the time series I/Q vector is selected for further processing. The selected portions are representative of epoch(s) of interest. These epoch(s) of interest are determined based on a particular part of the flight path of the detected object. A first set of I/Q data samples based on known qualities of a threat or ballistic object are often noisy and unsuitable for processing. Therefore, the epochs associated with these signals may be discarded. The number of epochs required to make a discrimination determination is not known a priori. Therefore, processing according to embodiments of the present disclosure may be performed until no further I/Q data is received from the discriminating radar, or until an estimated sufficient predetermined time period has passed.

In addition, for classification purposes (such as BMD classification) system determination as to whether a detected object is in a boost, midcourse, or terminal phase may be made based on external sensor information (e.g. calculated target acceleration). The phase of operation of the detected object may influence how downstream processing is performed. For example, during boost phase of an aerial object manifested by high acceleration, the system may, in response to such determination, automatically adjust so that smaller data sets may be acquired (via short time intervals such as about 50 milliseconds) due to the "smearing" of spectra. This may be realized by coupling of a radar tracking filter to the radar processor shown in FIG. 1 for adjusting measurement parameters based on the detected or tracked phase of the target. Processing in mid-course may be indicative of a zero gravity scenario for multi-vehicle differentiation and result in adjustment of radar processor time interval (e.g. adjust or increase sampling epoch such as by approximately 1 second).

When the epoch(s) of interest have been determined, the associated time series I/Q data samples may be filtered using an overlapping finite impulse response (FIR) filter of sufficiently high spectral quality. This filtering results in rapid attenuation of side lobes and roll off in the frequency domain. For example, a Blackman or Kaiser-Bessel filter may be used as a FIR filter, by way of non-limiting example. These filters result in side lobe attenuation of greater than about 60 dB when the time series is transformed into the frequency domain using a Fourier transform. The FIR filters operate to taper the time series to mitigate or minimize spectral ringing. Spectral ringing may have the effect of distorting features of interest in the cyclic processing. Epochs passed to the Fourier transform for transform to the frequency domain may be processed in a first-in, first-out (FIFO) manner, in the order that each epoch was created.

After parsing the FIR filtered data into epochs of interest (block 203), processing continues in block 205 wherein a Fourier spectrogram (or periodogram) is generated for a selected time series of samples in each epoch. The spectrogram provides a means for visually and computationally generating the power spectral density (PSD) of the time samples. Optional automated discrimination filtering functions (blocks 209a and 213a) illustrated in FIG. 2 may be implemented to perform one or more of the following operations:

1. A check of noise power for each frequency bin to determine whether the noise level of the time samples exceeds a threshold for effective cyclic processing. The threshold may be selectively based on information for threat events contained in the processing database. This may be implemented in filtering block 209a in order to discard excessively noisy or otherwise unsuitable data to maintain efficacy of the feature discrimination processing functionality.
2. A check of power per frequency bin to determine the occurrence of a major flight event (e.g. a rocket state separation, intercept event, flight event activity). Such events may have an effect on downstream cyclic processing steps. This may be implemented in filtering block 209a and/or 209b based on the FFT data and/or the cepstrum data to detect, notify, and/or control processing and adjust parameters in response to detected changes in power per frequency bin sufficient to indicate that a change in flight status has occurred. A control signal may be generated (blocks 209b and/or 213b) to provide a controllable action output therefrom.
3. A determination of a "kill assessment" may be implemented based on a check of power per frequency bin. For example, select statistical power distributions are indicators of an intercept event. When an intercept operation has been attempted, determination of these power distributions (e.g. cepstrum blossoming) may be used to determine whether additional countermeasures are needed to neutralize an object being targeted.

Epochs meeting any of the above three checks may be discarded by the radar system as unsuitable for classification or other processing.

The spectrogram output may be provided to an operator via a display in communication with the radar system to allow the operator to monitor successive series of epochs as they are produced. This provides situational awareness (SA) of the objects that are being monitored and/or targeted.

When the received time samples have been parsed and the desired epochs identified for processing, a dynamic FFT may be generated (block 207) on the epochs identified for processing. Algebraically, given an impulse transmitted waveform $x_c(t)$, and a received air target impulse response h(t), the received waveform x(t) for a time invariant system may be characterized as:

$$x(t)=a(t)e^{i\omega t+i\Theta(t)} \quad \text{Equation (4)}$$

As a(t) is periodic in time (t) with respect to the cyclic time period $T_p$, the complex-exponential Fourier series that follows is of the form:

$$a(t)=\Sigma_{n=-\infty}^{\infty}a_n e^{i\omega_p nt} \quad \text{Equation (5)}$$

wherein the angular frequency or rate $\omega_p=\frac{1}{2}\pi T_p$.

Accordingly, the resulting Fourier series coefficients $\{a_n\}$ are given as:

$$a_n = \frac{1}{T_p}\int_{-\frac{1}{2}T_p}^{\frac{1}{2}T_p} a(t)e^{-i\omega_p nt}\, dt \quad \text{Equation (6)}$$

The size of the FFT is dependent upon the level of frequency resolution targeted. As the selected epochs contain data obtained from a continuous wave or high pulse repetition frequency (PRF) radar return signal, the amount of frequency resolution available is limited by the number of points processed in the FFT. Processing time should not create a limitation. FFT length and frequency resolution, are determined based upon previously input settings provided (e.g. via a control or data input signal) to the processor that defines the operating characteristics of the radar being used. The input settings are chosen to optimize the spectral characteristics of the received signal based on the radar system used. By way of example, assuming a stable CW radar is used, an FFT size of 131072 points may be used. The FFT provides a representation of the samples in the frequency domain.

Figure 6:
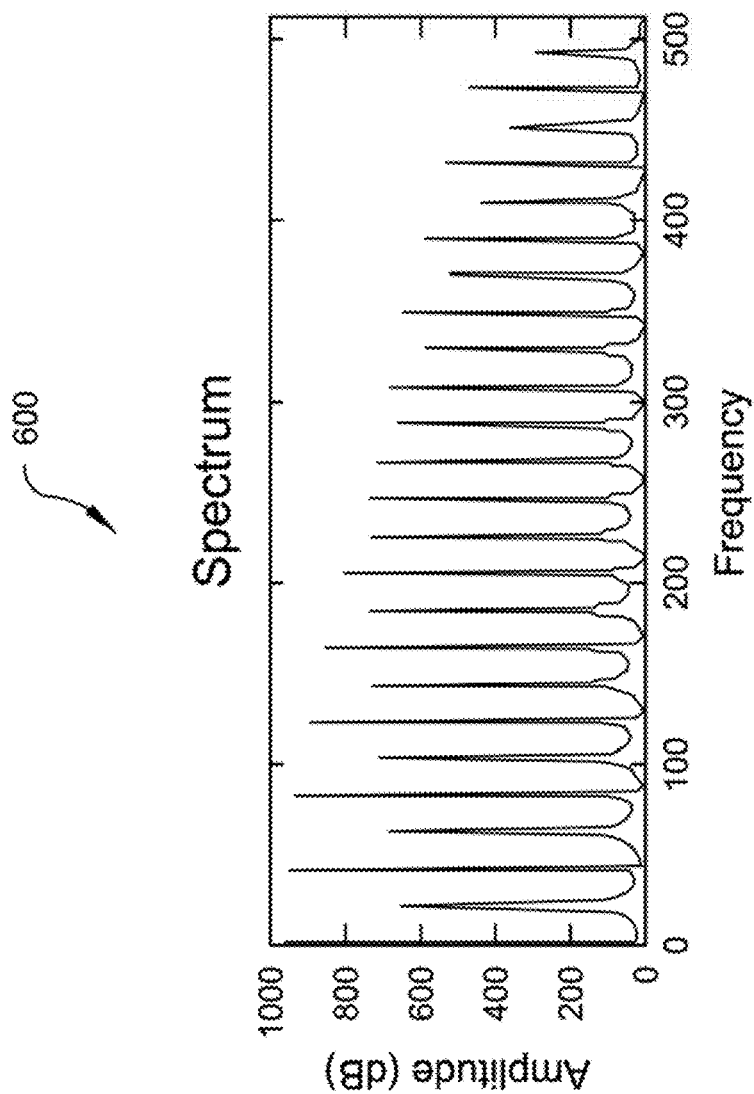
FIG. 6 is a graphical illustration of an exemplary frequency spectrum generated from a received radar return signal.
Figure 8:
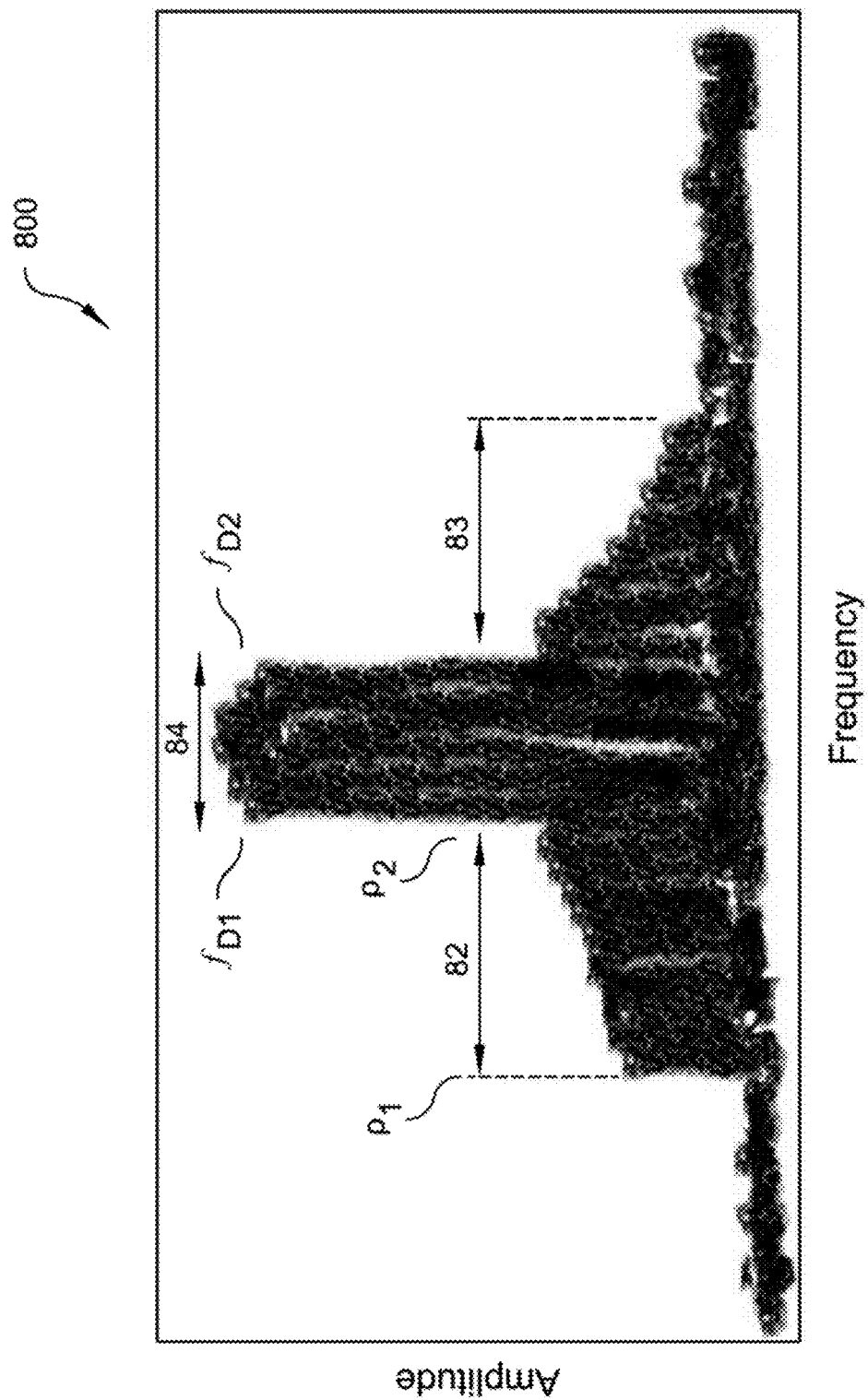
FIG. 8 illustrates an exemplary amplitude vs. frequency plot of a processed radar return signal associated with an identified missile threat.

The output frequency spectrum 600 (see FIG. 6) from the Fourier transform is then analyzed and the frequency families present in the received radar signal are sorted (block 209) by frequency and maximum energy levels (e.g. amplitude). Sorting the frequency spectrum in this manner serves two purposes. First, harmonic families relating to spectral peaks are identified in the various Doppler scatterers. The cyclic nature of Doppler scattering provides that the spectral peak used to calculate rotation (e.g. $\omega_{rot}$, used in Equation (8) below) is supported by a spectral family of harmonic frequencies, with $\omega_{rot}$ appearing as the peak with the highest amplitude. Thus, by sorting and finding the harmonics related to the largest peak, confirmation that the proper value of $\omega_{rot}$ is identified is achieved. Second, the Doppler pedestal created by both the main body rotation of the target object and any fins or other protrusions is measured, provided there is sufficient signal to noise ratio (SNR). The Doppler bins where sufficient energy exists form the values of Doppler frequencies $f_{D1}$ and $f_{D2}$ and rotational parameters $\rho_1$ and $\rho_2$ used in downstream calculations to determine the velocity of rotation of the main body of the target object and/or the length or other dimensions of fins or other protrusions on the target object's main body as described below with respect to Equation (14) and Equation (16). The parameters $f_{D1}$ and $f_{D2}$ represent the Doppler frequency extents for the main body of the missile (or missile section as depicted by eq. 10) and $\rho_1$ and $\rho_2$ are the Doppler frequency extents for the fins or protrusions as shown in FIGS. 3 and 8.

Figure 7A:
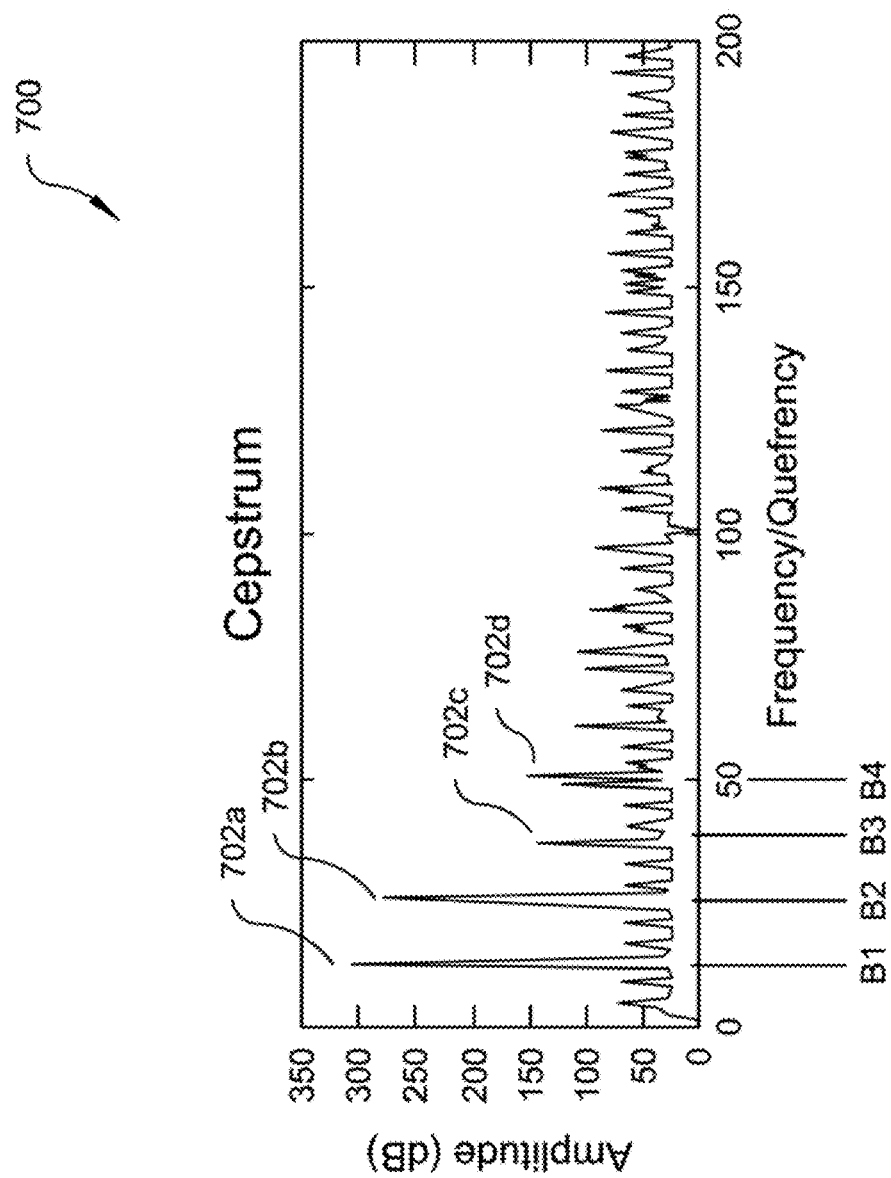
FIG. 7A is a graphical illustration of an exemplary compact cepstrum generated from the spectrum of FIG. 6.
Figure 7B:
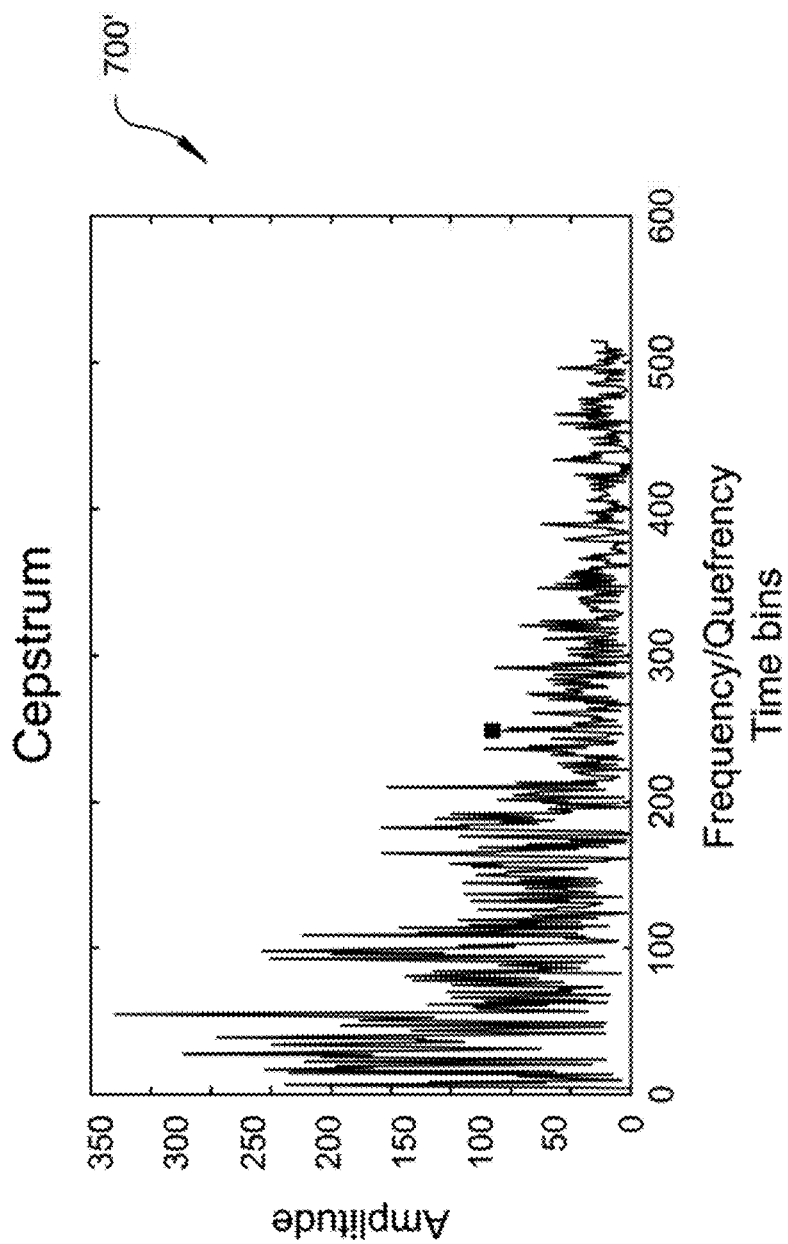
FIG. 7B is a graphical illustration of an exemplary non-compact cepstrum.

Still referring to FIG. 2, the computer processing embodied in the radar system of the present disclosure generates a cepstrum (e.g. FIGS. 7A, 7B). Analysis of the logarithm of the frequency domain spectrum is performed in block 211. In the exemplary cepstrum 700 shown in FIG. 7A, the cepstrum contains frequency elements that relate to reflections of objects or features of objects that are undergoing cyclic or periodic rotation. In the logarithmic frequency domain, these frequency elements are referred to as quefrencies. The cepstrum is a measure of the periodic components in the frequency space of a signal. The cepstrum representation c(t) of a continuous signal x(t) may be denoted:

$$c(t) = \frac{1}{2\pi}\int_{-\pi}^{\pi}\log|X(e^{j\omega})|e^{j\omega t}dt \qquad \text{Equation (7)}$$

Once the cepstrum is generated by the processing module of FIG. 2, processing proceeds to block 213 where the computer processing system is configured to separate or sort quefrencies into families and maximum (max) energy levels. More specifically, the cepstrum is processed to identify quefrency harmonic ("que-rahmonic") families pertaining to spectral peaks representative of the various detected rotating Doppler components. Processing includes comparing amplitudes of adjacent time/frequency bins for each of the bins representative of the Doppler cepstrum, as well as comparison with a noise threshold. Based on these comparisons, determination is made as to whether a single family of lines exists (corresponding to a relatively compact cepstrum with correlated energy peaks), multiple lines at many different bins (corresponding to a non-compact cepstrum with uncorrelated energy peaks) or no lines exist among different bins (corresponding to an object exhibiting controlled flight trajectory—no rotation). The cyclic nature of the Doppler scattering quefrency peak required to determine the rotational frequency $\omega_{rot}$ is determined according to:

$$\omega_{rot} = C_{peak}/N_{scat} \qquad \text{Equation (8)}$$

wherein $C_{peak}$ is the peak quefrency and $N_{scat}$ is the number of periodic scatters present.

This rotational formula is supported by a cepstral family of que-rahmonics. Although $C_{peak}$ should be the peak having the highest amplitude, by locating the que-rahmonics associated with the highest peak, it may be determined with high probability that the proper value for $C_{peak}$ is identified. The quefrency families are representative of a physical feature of the target undergoing periodic rotation. The physical features may include (but not limited to) one or more of fins, exhaust ports, boosters, bolts, rivets, and/or openings in, on, extending from, or coupled with, the object's main body. Other features providing periodic reflections based on rotational motion may also be identified. The detected features may be extracted by the processing system from the cepstrum and further processed in block 215. The detection of rotational scatterers aids in the process of classifying and identifying the observed object. Based on the classification and identification, an engagement decision may be made (block 217). This method provides for efficient use of resources and allows for higher probabilities of success for interception or engagement. Such engagement processing may include the activation of command and control systems for launching an intercept missile or to initiate other countermeasures, such as selection of a weapon or countermeasure, select use of the weapon or countermeasure, or change status or mode of operational systems and/or communications (e.g. turn off active sources).

In the cyclic approach, the quefrency cepstrum of the signal provides the rigid body rotation rate, which allows for a search of the spectral que-rahmonic family. Per Equation (8), spectrum peak (rotational component $(\omega_{rot})$)=(cepstrum peak ($C_{peak}$)/(number of periodic scatterers in family ($N_{scat}$)). For example, $N_{scat}$ will return the number of fins on a threat body, or other physical characteristics. The cepstrum is a measure of the periodicities in the frequency domain. It is, in essence, the inverse Fourier transform of the absolute value of the log frequency space. Additional cyclic signal sources show up as a separate cepstral family of harmonic (or que-rahmonic) signals. Therefore, the ratio formula for $N_{scat}$ is determined as:

$$N_{scat} = \frac{c_{peak}}{\omega_{rot}} \qquad \text{Equation (9)}$$

For the Doppler velocities of interest, since $V_R/c \ll 1$, then:

$$f_D \approx \frac{2\pi f_T V_R}{c} \qquad \text{Equation (10)}$$

wherein, $f_T$=transmitter frequency, $f_D$=Doppler frequency received; and $V_R$=range velocity component.

FIG. 3 is an illustration of a rotational torque vector about a spinning airborne object 301 (e.g., a missile). The rotational velocity component of the object or target may be determined as follows. $W_t$ represents the angular rotational frequency which is the same as $\omega_{rot}$ at a given time (t), while $\rho$ is related to $L_{fin}$ in Equation (16) which is the length of the fin. R represents the range from the missile to the radar. For rotational components r(t) according to FIG. 3, Equation (10) may be viewed as:

$$r(t)=R-\rho\sin(\omega t+\phi) \text{ with } \phi\rightarrow 0 \qquad \text{Equation (11)}$$

$$v(t)=R-\rho\sin(\omega t) \qquad \text{Equation (12)}$$

therefore:

$$v_{rotation}=r(dot)_{rotation}=\rho\omega \qquad \text{Equation (13)}$$

Thus, modifying Equation (10) for the difference between +/−rotation velocities (e.g. the difference in Doppler frequencies as torque arm 303 rotates in FIG. 3) yields a velocity of the rotation of the main body of the missile ($V_{RMB}$) according to:

$$V_{RMB} = f_{D1} - f_{D2} \approx (V_{R2} - V_{R1})\left(\frac{2\pi f_T}{c}\right) \text{ in m/s} \quad \text{Equation (14)}$$

Once the rotation of one or more features of the airborne object have been determined, the airborne object may be deemed to be under flight control, and aerodynamic features of the airborne object may be quantified and measured for more accurate classification.

Figure 4:
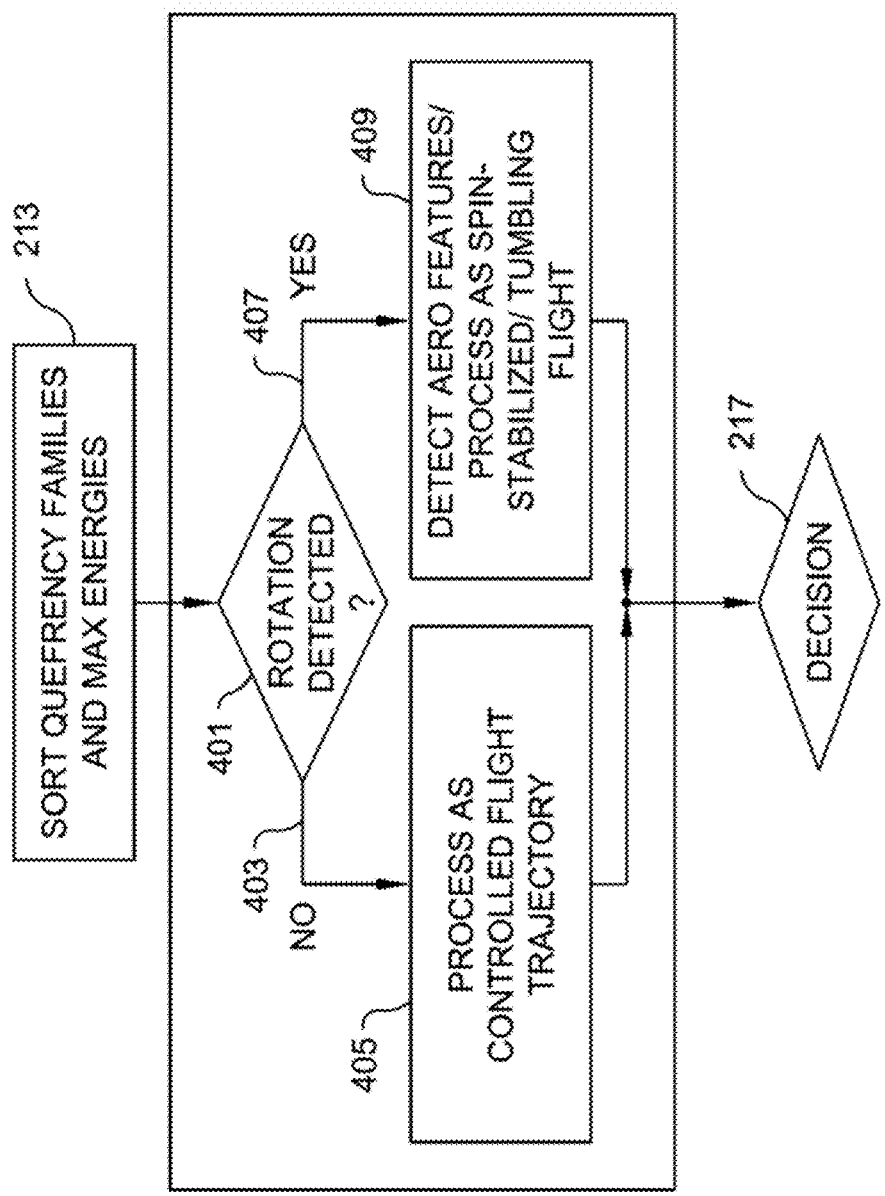
FIG. 4 is a diagram illustrating a process according to an embodiment of the disclosure.

FIG. 4 shows the processing of block 215 of FIG. 2 in greater detail, which may be implemented by a processor or classifier according to embodiments of the present disclosure. Identified quefrency families and quefrency peaks, as performed by a processor module as in block 213 of FIG. 2, are examined (block 401) to determine whether cyclic frequency patterns, indicating an ordered rotation of one or more features of the object relative to the radar system, are present. In this way discriminating between an identified object under controlled flight, under spin stabilization (e.g., spinning about its axis), or uncontrolled "tumbling" of freefall may be achieved. If no cyclic rotation $\omega_{rot}$ is detected (403), the object may be determined to be under controlled flight (block 405). If a rotation rate $\omega_{rot}$ exceeding a predetermined threshold is detected (407), the object may be determined to be operating under a spin-stabilized ballistic trajectory or may be deemed to be tumbling or in free-fall (block 409). Specifically, if a rotation rate $\omega_{rot}$ of sufficient magnitude is detected, the classifier may perform further cepstrum analysis. The system determines the presence (or absence) of a compact cepstrum by performing peak detection on the waveform depicted in FIG. 7 to determine the number and relative spacing of sharp peaks that decrease as a function of quefrency, as well as the low number of families representative of a compact cepstrum. On the condition that a compact cepstrum is determined to be present, the object may be classified as spinning about its axis, which may lead to a classification of a ballistic threat under spin-stabilization. Conversely, if no compact cepstrum is determined, the classifier may check for other features, such as wide oscillations in the cepstrum in an attempt to determine if an object is tumbling or in uncontrolled freefall. If such a determination cannot be made, the classifier may determine that too many objects, or too much noise, is present in the input data, and the process may be halted or repeated. FIG. 7A is indicative of a compact cepstrum 700 where que-rahmonics are clearly delineated. A cepstrum where tumbling or other complex motion is occurring (e.g. FIG. 7B) will result in a widening of the que-rahmonics in such a way that large pedestals occur and obfuscate the que-rahmonic families.

Figure 5:
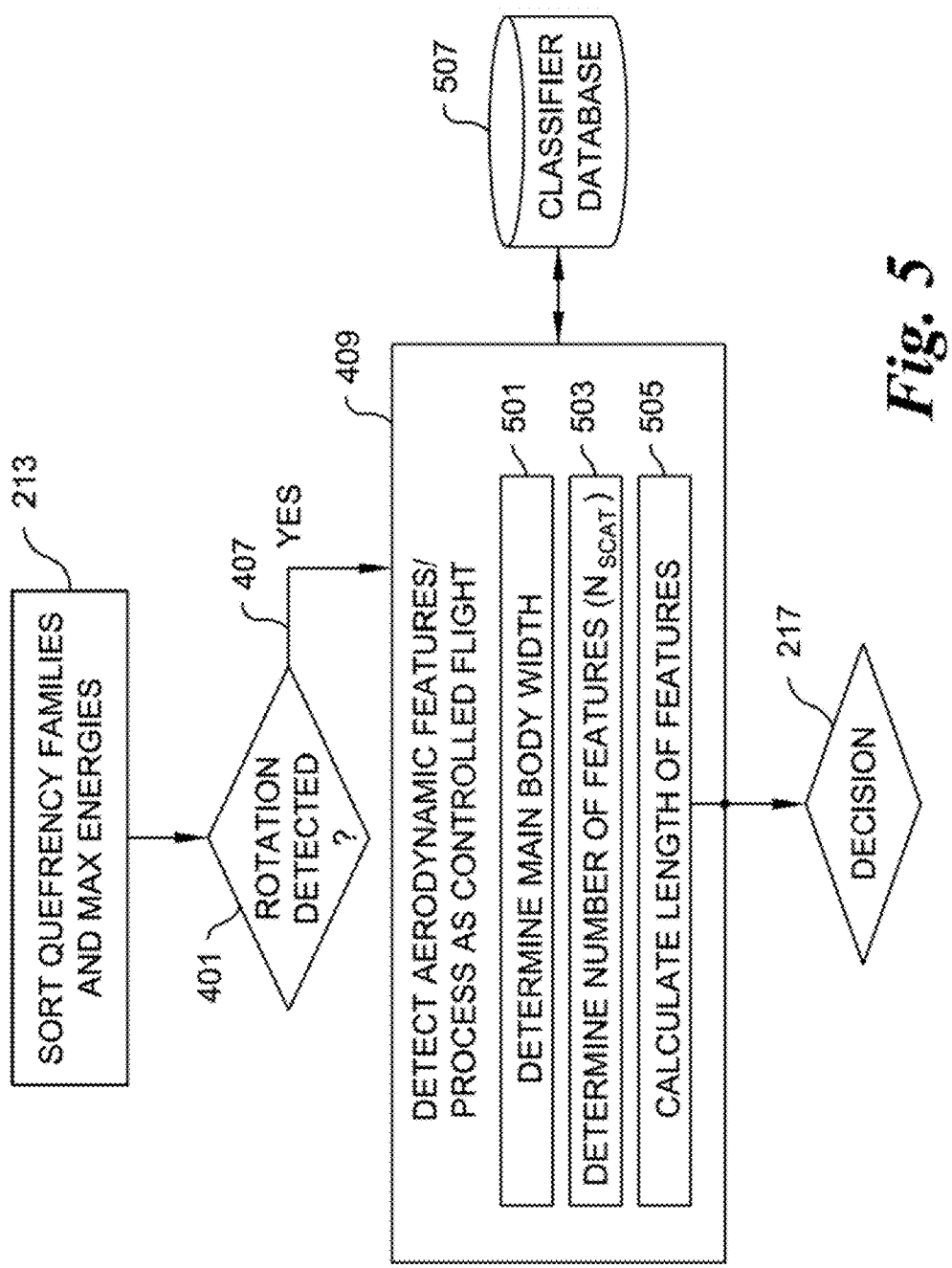
FIG. 5 is a diagram illustrating a further process for classification of a target object that has been determined to be rotating according to an embodiment of the disclosure.

Further processing of the quefrency families may be performed to detect, quantify and measure aerodynamic features of the object, allowing classification of the object based on known physical characteristics or properties stored in a classifier database containing signatures for various airborne objects known to exist. FIG. 5 is a diagram illustrating the process of detecting, quantifying and measuring aerodynamic features of an airborne object according to an embodiment of the disclosure. When ordered rotation of the object (rotational periodicity) is detected (block 407) based on analysis of quefrency peaks of a cepstrum, embodiments of the present disclosure may calculate or determine one or more characteristics of the object. Dimensionality of the object may be determined based on both cepstrum and spectral information from the detected target object. For example, the width of a main body of the object may be determined or measured (block 501), a number of features (e.g., the number of fins on a missile, the number of blades in a propeller, number of rivets on a body, number of apertures in a given section, etc.) may be calculated (block 503). Moreover, the length of these features may also be determined (block 505). When the number and dimensions of the physical attributes of the airborne object are determined by the computer system, the information is compared to data stored in a classifier database (block 507). The classifier database stores known information relating to various types and classes of airborne objects, and may be used to compare the measured features to known configurations. When a match is determined, the information is passed to a decision block 217. The decision block may include control for countermeasures, including systems providing command and control of interceptor missiles or may implement other countermeasures. Based on the classification of the detected target, the command and control system may make informed decisions for the effective countermeasure options and further provide command and control to operations to rendezvous and intercept the airborne object. Aerodynamic feature extraction and identification according to blocks 501, 503 and 505 may be further described as follows.

With reference to FIG. 8 there is shown an exemplary amplitude vs. frequency plot of a radar return signal associated with an identified missile threat. As illustrated, spectral fin expanse (82, or 83) and spectral main body expanse 84 may be measured in order to aid in the classification process. For example, a main body width ($W_{MB}$) is equal to its velocity $V_{RMB}$ divided by twice its rotation rate ($\omega_{rot}$) from Equation (14):

$$W_{MB} = \frac{V_{RMB}}{2\omega_{rot}} \text{ in meters/epoch} \quad \text{Equation (15)}$$

In addition to determining the main body length, computations may be performed to determine a feature length such as missile fin length ($L_{fin}$) in the Doppler direction (as shown as the torque arm p in FIG. 3). With reference to FIG. 3 in conjunction with the computer processing illustrated in FIG. 5, FIG. 8 and Equations (10-13), feature length is determined as:

$$L_{fin} = \rho_2 - \rho_1 = \frac{(f_{D2} - f_{D1})c}{2f_T w_{rot}} \text{ in meters/epoch} \quad \text{Equation (16)}$$

The results of the feature extraction determination methods and calculations 409 produce the following: missile rotation rate; the number of fins/stabilizers/protrusions; main body width, and fin or protrusion length (in Doppler direction) per epoch. These classification parameters serve as input to a classifier processor. In embodiments, the sidelobes shown in the frequency spectrum illustrated in FIG. 8 are manifest over time, and the system operates to determine $\rho_1$ and $\rho_2$ based on the longer of the sidelobes. In certain instances, such as processing of limited input data, only one set of sidelobes (e.g. 82) is generated in the processed data which the system utilizes to determine $\rho_i$ and $\rho_2$. On the condition that neither sidelobes 82, 83 is present, the processor 105 (FIG. 1) makes the determination that the detected object possesses no fins or protruding features (e.g. bullet or motor) to aid in the target classification. The classifier may be implemented as a computer processor server configured to perform the calculations of a Bayesian, fuzzy logic or neural network processor, depending on the characteristics of the data and whether multiple levels of classification entities are being performed as is calculated when using a transferrable belief model (TBM). The classifier may be trained with representative "truth" data so that when the identified classification parameters are applied, a predicted greatest likelihood classification is calculated.

In an embodiment, for the three different ballistic missile defense phases,

1. Boost—the specific missile type (and confusion class) is given (e.g. SCUD, Saturn V, or the like);
2. Midcourse—the specific objects in the scene are classified (e.g. booster, decoy, RV, etc.). Under certain conditions, the classifier may be unable to classify specifically at this level of detail depending on the object(s) that are detected and their position within the scene as viewed by the radar sensor. Accordingly, the outcomes of the Midcourse classification may identify target states as, "tumbling", "spin stabilized" or "aero-structures/no aero-structures"; and
3. Terminal—if the detected object is detected while in the atmosphere, then it is determined by the system to be an RV. The classification scheme may determine if the RV is following a simple ballistic trajectory, or whether the RV includes maneuvering capabilities.

In embodiments, distinct classifiers may be employed for the boost, midcourse, and terminal phases. Databases of possible classifications may be provided for each phase, the classifiers being configured to determine a most likely classification based on received input data.

Figure 9:
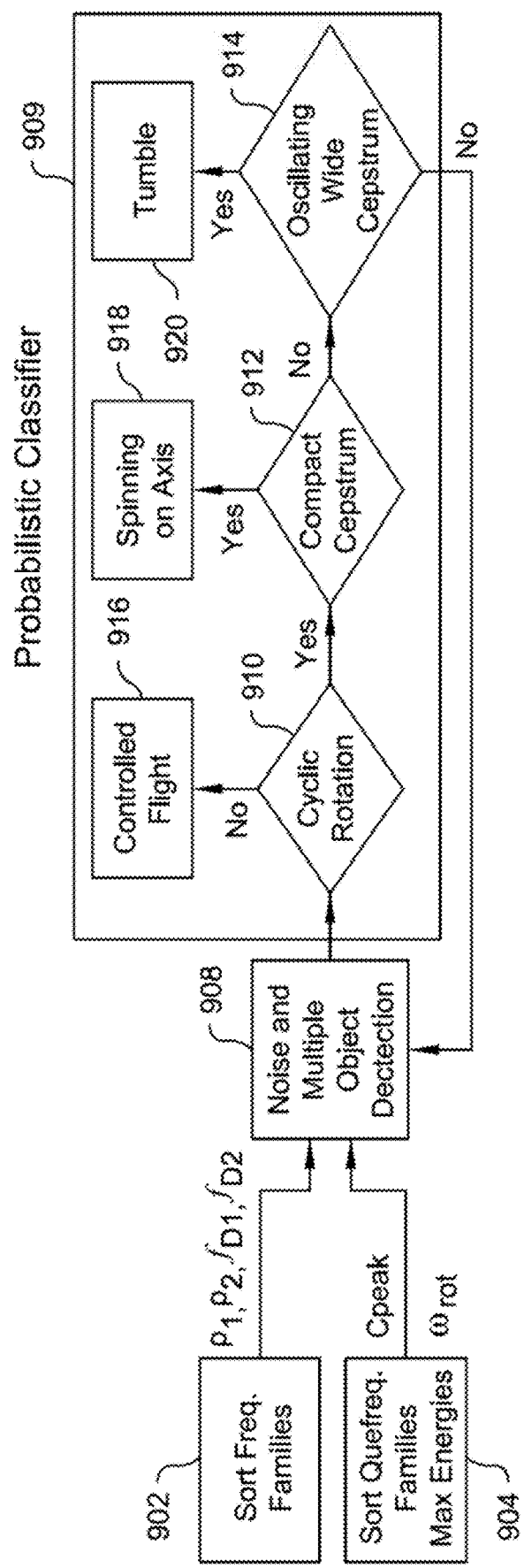
FIG. 9 illustrates an exemplary process for determining classification of an airborne target according to an embodiment of the disclosure.

Referring now to FIG. 9 (in conjunction with FIGS. 4, 6, and 7) there is shown an exemplary process for determining classification of an airborne target according to an embodiment of the present disclosure. By means of a high resolution Doppler radar transmitter/receiver with high pulse repetition frequency (PRF) of, for example, at least 20,000 Hz for measuring select cyclic Doppler characteristics of one or more airborne targets of interest, reflections of transmitted radar signals directed at ballistic and/or non-ballistic objects may be processed by a radar processor according to a cyclic processing method of the present disclosure. In block 902, the received I/Q data is processed by a computer processing module to generate spectrum peaks and harmonics which are then sorted and frequency families identified (600 of FIG. 6). From the spectral density the rotational frequency ω is determined along with determination of spectrum pedestal widths. In block 904 cepstrum peaks and rahmonics are calculated by a computer processing module and then sorted and quefrency families identified (700 of FIG. 7A) for generating $c_{peak}$ and $w_{rot}$. The system operates to determine cepstrum smearing or widening for detected tumbling vs. spinning objects.

Noise and multiple object detection processing is performed in block 908. This may be implemented via one or more low pass filters and comparators configured to determine whether the input data is too noisy (e.g. detected noise value exceeds a threshold noise level) or if there are multiple object detections (multiple objects) within the radar beam. On the condition that module 908 determines that the SNR of the input data set is below a given SNR threshold (too noisy), or on the condition that frequency detection indicates too many objects in the radar beam, the system is configured to discard its input data set and proceed to the next sample data set from blocks 902 and 904. No processing of the data occurs when the complexity of the spectrum exceeds a predetermined threshold and/or an unstable spectrum over multiple epochs is determined. Otherwise, processing proceeds to probabilistic classifier 909. In an embodiment, classifier 909 may be embodied as a Bayesian computer processor classifier. In another embodiment, classifier 909 may be embodied as a fuzzy logic processor. In another embodiment, the classifier may be embodied as a neural network processor, by way of non-limiting example.

According to an embodiment, in block 910, the system checks for consistent cepstral response (consistent $\omega_{rot}$) over a given number of data samples to make a determination as to cyclic rotation of the target object. If no quefrency families are identified in the cepstrum (e.g. noisy output with no identifiable periodic peaks), then no cyclic component exists and a determination is made that the target is exhibiting controlled flight (block 916). The detected spectrum will lack any form of missile component fin and main body set of "flashes" (such as those shown in FIG. 8) when an object exhibits controlled or stabilized flight (e.g. no object spin/tumbling). In this condition, a single tone spectrum is detected representative of an object undergoing controlled flight.

Figure 9A:
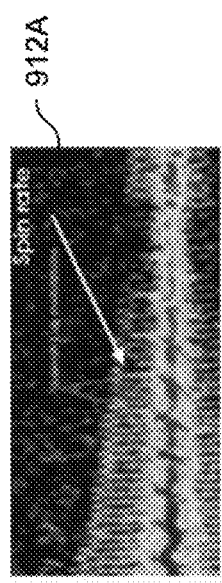
FIG. 9A illustrates signal data for determining spin rate associated with a given target exhibiting a compact cepstrum useful in illustrating aspects of the present disclosure.

On the condition that the system detects a consistent non-zero $\omega_{rot}$ value (corresponding to cyclic rotation), processing proceeds to block 912 for determination of a compact cepstrum. The system is configured to determine from the cepstrum plot whether a compact cepstrum of the data and a single spectral family is exhibited, which is indicative of a single spinning object or target. FIG. 7A is an example of a target or object exhibiting a compact cepstrum. A processing module compares the detected quefrency peaks 702a-d in the cepstrum 700 to determine if the peaks are at even multiples of one another (B1-B4). If the module detects a match, then the first peak (702a at B1) is determined as $c_{peak}$. Reference 912A of FIG. 9A illustrates an exemplary detected spin rate for an object that corresponds to a compact cepstrum having $c_{peak}$ 702a and linear multiples at peaks 702b, 702c, and 702d illustrated in the plot of FIG. 7A. In this case the evenly spaced peak determination indicates a single rotational velocity and enables classification that the target is spinning on its axis (block 918). Otherwise, processing proceeds to block 914 wherein the system checks for a wide cepstrum pedestal indicative of multiple cyclic quefrencies as well as frequency content.

Figure 9B:
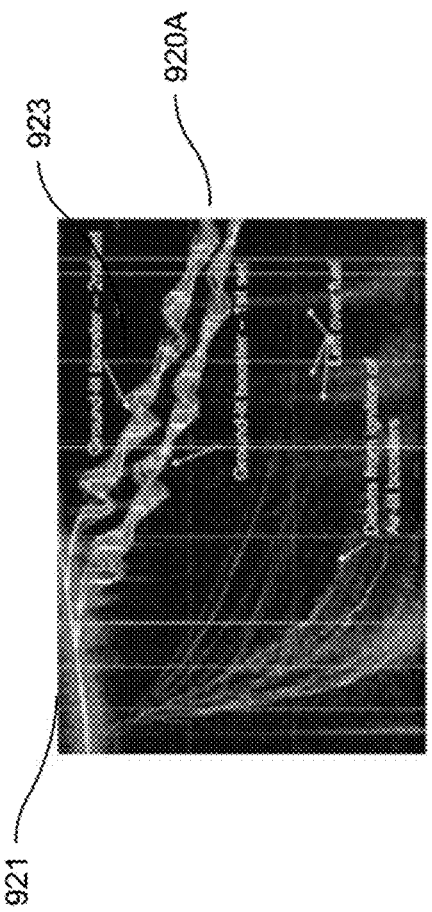
FIG. 9B illustrates exemplary track data and tumbling characteristic motion associated with a ground lit booster useful for illustrating aspects of the present disclosure.
Figure 9C:
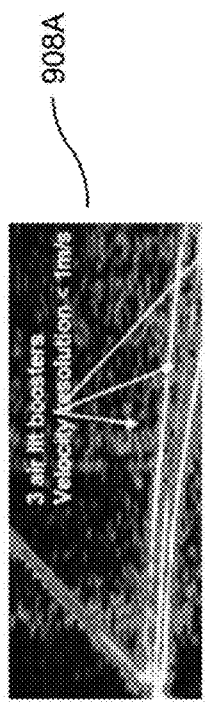
FIG. 9C illustrates exemplary track data for a plurality of air lit boosters useful for illustrating aspects of the present disclosure.

FIG. 7B is an exemplary illustration of a cepstrum associated with a tumbling object. For a cepstrum 700' as shown in FIG. 7B, the system detects multiple bins and peaks that do not correspond to linear multiples illustrated in FIG. 7A. Detection processing includes performing a search function over the processing period and comparing energies per bin to determine an average energy per bin, to assess the width of the energy spectrum, by way of non limiting example. A wide energy spread shown in FIG. 7B indicates randomized or uncorrelated tones, unlike the rahmonics of the compact cepstrum shown in FIG. 7A. Determination of an oscillating wide cepstrum (non-compact cepstrum) results in the classifier identifying the target as tumbling (block 920). Otherwise, no determination of the data could be made by classifier 909 and processing returns to noise detector 908 for processing of the next I/Q data. FIG. 9B illustrates exemplary track data 920A of an object showing a spin portion 921 (corresponding to compact cepstrum of FIG. 9A) which transitions to a tumbling portion 923 associated with a ground lit booster (corresponding to the non-compact cepstrum of FIG. 7B illustrating multiple periodicities and complex motion/tumbling). FIG. 9C illustrates exemplary track data 908A of three air lit boosters.

Figure 10:
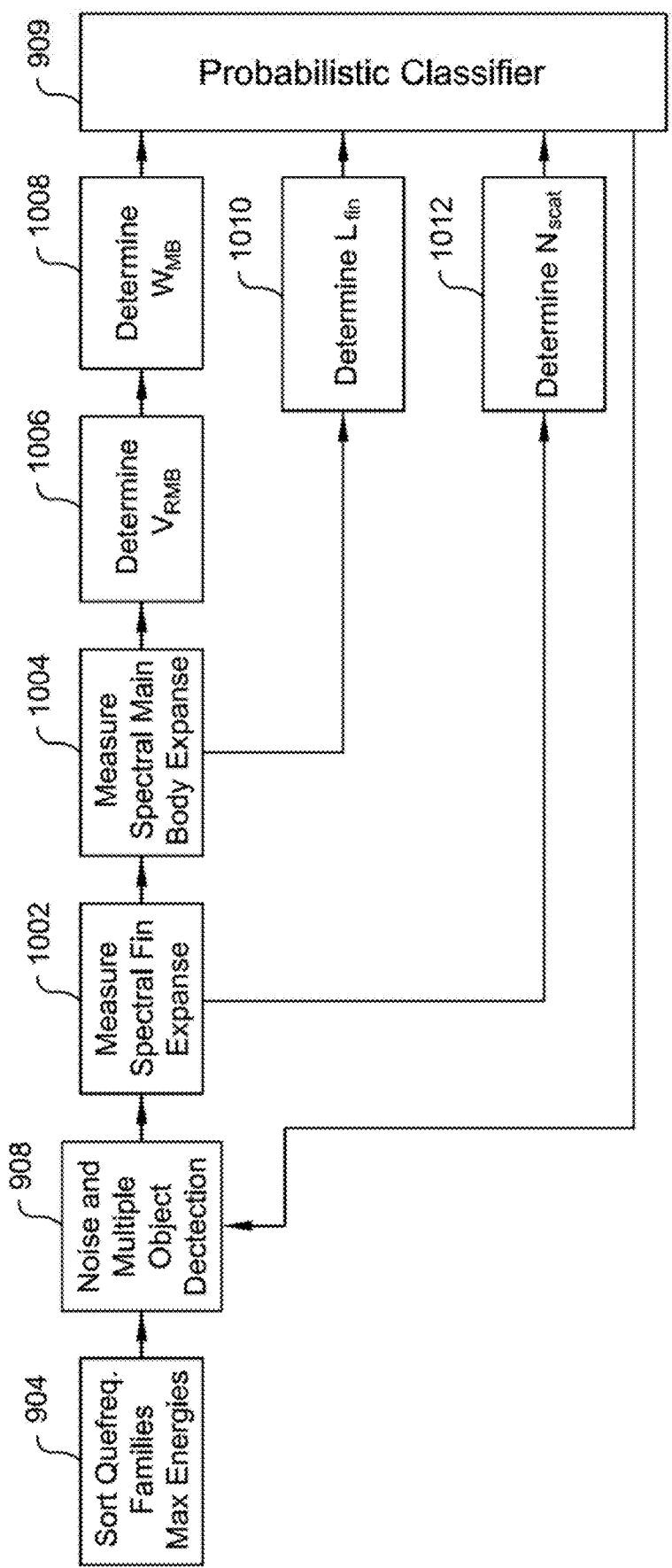
FIG. 10 illustrates an exemplary process for determining airborne target features according to an embodiment of the disclosure.

Referring now to FIG. 10 (in conjunction with FIGS. 5-8) there is shown an exemplary process for determining features of an airborne target according to an embodiment of the present disclosure. By means of a high resolution Doppler radar transmitter/receiver system with high pulse repetition frequency (PRF) of at least 20,000 Hz for measuring select cyclic Doppler characteristics of one or more airborne targets of interest, reflections of transmitted radar signals directed at ballistic and/or non-ballistic objects may be processed by a radar processor according to a cyclic processing method of the present disclosure. As discussed herein, the received I/Q data is processed to generate spectrum peaks and harmonics which are sorted and frequency families identified (FIG. 6) for generating rotational frequency ω. In block 904 cepstrum peaks and rahmonics are calculated and then sorted and quefrency families identified for generating $c_{peak}$. Noise and multiple object detection processing is performed in block 908 via one or more low pass filters configured to determine whether the input data is too noisy or if there are multiple objects detected within the radar beam. If filter 908 determines that the SNR of the data is below a given threshold (too noisy) or if the frequency analysis indicates too many objects in the radar beam, then the system is configured to discard its input data and proceed to the next sample data. No processing of the data occurs when the complexity of the spectrum exceeds a predetermined threshold and/or an unstable spectrum over multiple epochs is determined. Otherwise, processing proceeds to block 1002 for measuring the spectral fin expanse 82,83 and block 1004 for measuring the spectral main body expanse 84 of the target object with reference to FIG. 8. The output of module 1004 is input to block 1006 for determining the velocity of the target object $V_{RMB}$ as well as to block 1010 for determining target object fin length $L_{fin}$ and to block 1012 for determining the number of fins $N_{fin}$. The output of block 1006 is applied to processing block 1008 for determining the main body width $W_{MB}$.

When the number and dimensions of the physical attributes of the airborne object are determined by the computer system, the information is compared to data stored in a classifier database 909. The classifier database stores known information of various known targets and their physical features corresponding to one or more of the attributes of spectral fin expanse, spectral main body expanse, main body width $W_{MB}$, target velocity (e.g. maximum, average, mode, etc.), fin length, and number of fins. The classifier may be implemented as a computer processor configured to perform the calculations of a Bayesian, fuzzy logic or neural network processor, depending on the characteristics of the data and whether multiple levels of classification entities are being performed as is calculated when using a transferrable belief model (TBM). The classifier may be trained with representative "truth" data so that when the classification parameters are applied, a predicted greatest likelihood classification is calculated. When a match is determined (e.g. results match within a predetermined threshold), the information associated with the identified target is passed to a decision module (not shown). The decision module may include control for countermeasures, including systems providing command and control of interceptor missiles or may implement other countermeasures. Based on the classification of the detected target, the command and control system may make informed decisions for the effective countermeasure options and further provide command and control to operations to rendezvous and intercept the airborne object.

In one exemplary embodiment, for a negative Doppler fin expanse of: 22.42-19.01 kHz=3.41 kHz; and main body Doppler expanse of: 23.10-22.58 kHz=0.52 kHz; a rotation rate is (from spectrum and cepstrum peaks) equal to 5 Hz. The system and method further determines (from Equation (7)): 0.52 kHz is ($f_{d2}-f_{d1}$) with 10.00 GHz ($f_t$). A $V_{RMB}$ is determined as 520 Hz($3 \times 10^8$ m/s)/2($10 \times 10^9$ Hz)=7.8 m/s. The system and method further determines (from Equation (8)): dividing by 2× rotation rate (+/−Doppler effects rotating around 0 Hz relative) of 5 Hz to obtain: 7.8 m/s/(2)(5)=$W_{MB}$=0.78 m/cycle (epoch). The fin length looking at ρ (from Equation (9)) yields: $\rho_2-\rho_1$=3410 Hz($3 \times 10^8$ m/s)/4π($10 \times 10^9$ Hz)(5 Hz)=$L_{fin}$=1.628 m/cycle (epoch).

The embodiments are provided by way of example only, and other embodiments for implementing the methods described herein may be contemplated by one of skill in the pertinent art without departing from the intended scope of this disclosure. For example, processing systems described herein may include memory containing data, which may include instructions, the instructions when executed by a processor or multiple processors, cause the steps of a method for performing the operations set forth herein. The above-described processing components (e.g. radar processor 105, memory 107, transmit/receive controller 109) may be embodied as a single multi-purpose processor, or other discrete processor suitable for performing the described operations without departing from the scope of the present disclosure. For example, Fourier transform operations may be implemented via one or more field programmable gate arrays (FPGAs) and other operations performed by suitably programmed processing devices. Software may be embodied in a non-transitory machine readable medium upon which program instructions may be stored, the stored instructions when executed by a processor cause the processor to perform the steps of the methods described herein. Suitable machine readable media may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While embodiments have been described herein in relation to Doppler radar processing with ground based receivers for detection and classification of airborne targets, it is contemplated that the systems and methods described herein may be applicable in other technological fields. For example, embodiments may find application in the context of undersea (e.g. sonar) target detection and/or classification, as well for machinery diagnostics monitoring (e.g. assembly line processing for detecting and/or classifying abnormalities, misalignments, or malfunctions of equipment in relation to their known or expected characteristics and rotational frequencies). Still further, embodiments of the present disclosure may have application in the fields of medical devices and monitoring, including detection and/or classification in the fields of heart monitoring equipment for detecting abnormal heart conditions, murmurs, distortion, and other coronary or biological systems, where moving bodies and rotational protuberances may be present.

While the foregoing has been described with reference to the above-described embodiments, various modifications and changes can be made without departing from the spirit of the invention. Accordingly, all such modifications and changes are considered to be within the scope of the appended claims. The specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A Doppler radar system for determining a rotational state of an airborne object, the system comprising:
    a Doppler radar processor;
    a memory in communication with the Doppler radar processor; and
    a controller in communication with the memory and the Doppler radar processor, wherein the memory stores computer readable instructions that when executed by the Doppler radar processor perform the steps of:
        generating a frequency spectrum corresponding to the detected airborne object based on processing of received radar signals reflected off an airborne object;
        generating a quefrency cepstrum based on processing of the generated frequency spectrum and corresponding to the detected airborne object;
        determining a presence or absence of one or more quefrency peaks in the quefrency cepstrum based on analysis of the quefrency cepstrum;
        determining a rotational state of the airborne object responsive to the determining of the presence or absence of one or more quefrency peaks and comparison with one or more threshold values.

2. The system of claim 1, wherein the Doppler radar processor is configured to provide control commands to the controller to cause transmission of a radar signal as a continuous wave (CW) Doppler radar signal to the airborne object to generate the reflected radar signals.

3. The system of claim 2, wherein the computer readable instructions contain instructions which when executed by the radar processor, cause the radar processor to further calculate a rotational velocity associated with the airborne object, and compare the calculated rotational velocities of the detected airborne object over a predetermined number of data samples to detect the presence or absence of a cyclic rotation component of the detected airborne object.

4. The system of claim 3, wherein the Doppler radar processor generates an output indicative of a determination that the rotational state of the airborne object is in a state of controlled flight when no cyclic rotation component is detected.

5. The system of claim 3, wherein the Doppler radar processor generates an output indicative of a determination that the rotational state of the airborne object is in a state of axial spin in response to detection of the presence of a cyclic rotation component in said cepstrum and detection of linear multiples of quefrency peaks in said cepstrum.

6. The system of claim 2, wherein the computer readable instructions contain instructions which when executed by the radar processor, cause the radar processor to further determine a sample vector size defining the number of samples of the received radar signals to be processed in an epoch based on a selected threat mode of the detected airborne object.

7. The system of claim 6, wherein the selected threat mode is one of a ballistic missile boost, midcourse, and terminal phase, and wherein the number of samples to be processed in an epoch is at least the Nyquist rate for sampling a minimum of two rotations of at least one feature of the airborne object.

8. The system of claim 6, wherein the Doppler radar processor is configured to automatically adjust the sample vector size according to a sensed environmental condition or selected threat mode.

9. A method comprising the steps of:
    receiving reflected radar signals off of an airborne object;
    in a Doppler radar computer processing device,
        generating a frequency spectrum corresponding to the airborne object based on processing of received radar signals reflected off an airborne object;
        generating a quefrency cepstrum based on processing of the generated frequency spectrum and corresponding to the detected airborne object;
        determining a presence or absence of one or more quefrency peaks in the quefrency cepstrum based on analysis of the quefrency cepstrum;
        determining a rotational state of the airborne object responsive to the determining of the presence or absence of one or more quefrency peaks and comparison with one or more threshold values.

10. The method of claim 9, wherein the step of determining a rotational state of the airborne object responsive to the determining of the presence or absence of one or more quefrency peaks and comparison with one or more threshold values further comprises comparing a rotational velocity of the detected airborne object over a predetermined number of data samples to detect the presence of a cyclic rotation component of the detected airborne object.

11. The method of claim 10, wherein, on the condition that no cyclic rotation component is detected, generating an output indicative of a determination that the rotational state of the airborne object is in a state of controlled flight.

12. The method of claim 10, wherein, on the condition that a cyclic rotation component is detected, comparing the detected quefrency peaks in the cepstrum to determine whether the detected quefrency peaks are linear multiples of one another.

13. The method of claim 12, wherein, responsive to determining that the detected quefrency peaks are linear multiples of one another, generating an output indicative of a determination that the rotational state of the airborne object is in a state of axial spin.

14. The method of claim 12, wherein, responsive to determining that the detected quefrency peaks are not linear multiples of one another, generating an output indicative of a determination that the rotational state of the airborne object is in a tumbling state.

15. The method of claim 9, further comprising the step of determining a sample vector size defining the number of samples of the received radar signals to be processed in an epoch based on a selected threat mode of the detected airborne object.

16. The method of claim 15, wherein the selected threat mode is one of a ballistic missile boost, midcourse, and terminal phase, and wherein the number of samples to be processed in an epoch is at least a Nyquist rate for sampling a minimum of two rotations of at least one identified feature of the airborne object.

17. The method of claim 16, further comprising automatically adjusting the sample vector size according to a sensed environmental condition or selected threat mode.

18. The method of claim 15, further comprising the step of filtering the target time series of samples using a finite response filter (FIR) to provide attenuation of side lobes and roll off in the frequency domain.

19. The method of claim 15, further comprising the steps of:
 generating a power spectral density of a time series of data samples in an epoch; and
 comparing a noise level of the target time series of samples to a noise level threshold for cyclic processing.

20. The method of claim 9, wherein the Doppler radar computer processing device is configured as a continuous wave (CW) Doppler radar.

* * * * *